United States Patent
Cunningham et al.

(10) Patent No.: US 11,867,106 B2
(45) Date of Patent: Jan. 9, 2024

(54) SYSTEMS AND METHODS FOR DESULFATION OF CATALYSTS INCLUDED IN AFTERTREATMENT SYSTEMS

(71) Applicant: Cummins Emission Solutions Inc., Columbus, IN (US)

(72) Inventors: Michael Cunningham, Columbus, IN (US); Aleksey Yezerets, Columbus, IN (US); Junhui Li, Columbus, IN (US); James A. Cramer, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/197,930

(22) Filed: May 16, 2023

(65) Prior Publication Data
US 2023/0287816 A1    Sep. 14, 2023

Related U.S. Application Data

(62) Division of application No. 17/602,233, filed as application No. PCT/US2020/025647 on Mar. 30, 2020, now Pat. No. 11,698,011.
(Continued)

(51) Int. Cl.
*F01N 3/10*    (2006.01)
*F01N 13/00*    (2010.01)
(Continued)

(52) U.S. Cl.
CPC .......... *F01N 3/103* (2013.01); *B01D 53/9477* (2013.01); *B01D 53/9495* (2013.01);
(Continued)

(58) Field of Classification Search
CPC .......... F01N 3/103; F01N 3/021; F01N 3/023; F01N 3/2066; F01N 9/002; F01N 13/009;
(Continued)

(56) References Cited

U.S. PATENT DOCUMENTS 8,596,045 B2 * 12/2013 Tuomivaara ........ F02D 41/1463
60/297
9,228,468 B2    1/2016 Yezerets et al.
(Continued)

OTHER PUBLICATIONS

Examination Report issued for UK Patent Application No. GB2113804.5, dated Jul. 6, 2022.
(Continued)

*Primary Examiner* — Brandon D Lee
(74) *Attorney, Agent, or Firm* — Foley & Lardner LLP

(57) ABSTRACT

An aftertreatment system for reducing constituents of an exhaust gas having a sulfur content includes: an oxidation catalyst; a filter disposed downstream of the oxidation catalyst; and a controller configured to, in response to determining that the filter is to be regenerated and a desulfation condition being satisfied: cause a temperature of the oxidation catalyst to increase to a first regeneration temperature that is greater than or equal to 400 degrees Celsius and less than 550 degrees Celsius, cause the temperature of the oxidation catalyst to be maintained at the first regeneration temperature for a first time period, and after the first time period, cause the temperature of the oxidation catalyst to increase to a second regeneration temperature equal to or greater than 550 degrees Celsius.

4 Claims, 10 Drawing Sheets

Related U.S. Application Data

(60) Provisional application No. 62/831,482, filed on Apr. 9, 2019.

(51) Int. Cl.

| | | |
|---|---|---|
| *B01D 53/94* | (2006.01) | |
| *B01D 53/96* | (2006.01) | |
| *F01N 3/023* | (2006.01) | |
| *F01N 3/20* | (2006.01) | |
| *F01N 9/00* | (2006.01) | |
| *F01N 3/021* | (2006.01) | |

(52) U.S. Cl.
CPC ............. *B01D 53/96* (2013.01); *F01N 3/021* (2013.01); *F01N 3/023* (2013.01); *F01N 3/2066* (2013.01); *F01N 9/002* (2013.01); *F01N 13/009* (2014.06); *B01D 2251/208* (2013.01); *B01D 2251/2067* (2013.01); *F01N 2570/04* (2013.01); *F01N 2900/1602* (2013.01); *F01N 2900/1612* (2013.01)

(58) Field of Classification Search
CPC ......... F01N 2570/04; F01N 2900/1602; F01N 2900/1612; B01D 53/9477; B01D 53/9495; B01D 53/96; B01D 2251/2067; B01D 2251/208

See application file for complete search history.

(56) References Cited

U.S. PATENT DOCUMENTS

| | | | |
|---|---|---|---|
| 9,657,665 | B2 | 5/2017 | Yezerets et al. |
| 9,856,773 | B1 | 1/2018 | Park et al. |
| 2008/0271440 | A1 | 11/2008 | Xu et al. |
| 2014/0331644 | A1* | 11/2014 | Kumar ................... F01N 3/103 |
| | | | 60/297 |
| 2015/0135680 | A1 | 5/2015 | Ancimer et al. |
| 2015/0218992 | A1 | 8/2015 | Yezerets et al. |
| 2016/0032850 | A1 | 2/2016 | Sunley et al. |
| 2017/0159535 | A1 | 6/2017 | Hall et al. |
| 2019/0083967 | A1 | 3/2019 | Yang et al. |

OTHER PUBLICATIONS

First Office Action issued for Indian Patent Application No. IN 202147045575, dated Nov. 16, 2021.

International Search Report and Written Opinion issued for PCT Application No. PCT/US2020/025647, dated Jun. 19, 2020.

* cited by examiner

SYSTEMS AND METHODS FOR DESULFATION OF CATALYSTS INCLUDED IN AFTERTREATMENT SYSTEMS

CROSS-REFERENCE TO RELATED APPLICATIONS

The present disclosure is a divisional of U.S. patent application Ser. No. 17/602,233, filed Oct. 7, 2021, which is a national phase of PCT Application No. PCT/US2020/025647, filed Mar. 30, 2020, which claims the benefit of U.S. Provisional Application No. 62/831,482, filed Apr. 9, 2019. The contents of these applications are incorporated by reference in their entireties.

TECHNICAL FIELD

The present disclosure relates generally to aftertreatment systems for use with internal combustion (IC) engines.

BACKGROUND

Exhaust gas aftertreatment systems are used to receive and treat exhaust gas generated by IC engines. Generally, exhaust gas aftertreatment systems comprise any of several different components to reduce the levels of harmful exhaust emissions present in exhaust gas. For example, certain exhaust gas aftertreatment systems for diesel-powered IC engines comprise an oxidation catalyst for oxidizing carbon monoxide (CO) or unburnt hydrocarbons, and may also be used to increase a temperature of the exhaust gas for regenerating a filter disposed downstream of the oxidation catalyst. Aftertreatment systems may also include a selective catalytic reduction (SCR) system for decomposing constituents of the exhaust gas such as nitric oxides ($NO_X$) gases included in the exhaust gas. The fuel being combusted by some IC engines may include a high sulfur content, which may deteriorate the oxidation catalyst and/or the SCR catalyst.

SUMMARY

Embodiments described herein relate generally to systems and methods for desulfating, i.e., removing sulfur accumulated on an oxidation catalyst or a SCR catalyst included in an aftertreatment system. In particular, systems and methods described herein include heating an oxidation catalyst or a SCR catalyst to a regeneration temperature lower than a conventional regeneration temperature so as to desulfate the oxidation catalyst or the SCR catalyst while reducing hydrothermal aging.

In some embodiments, an aftertreatment system for reducing constituents of an exhaust gas having a sulfur content, comprises an oxidation catalyst; a filter disposed downstream of the oxidation catalyst; and a controller configured, in response to determining that the filter is to be regenerated and an oxidation catalyst criteria is satisfied, to: cause a temperature of the oxidation catalyst to increase to a first regeneration temperature that is greater than or equal to 400 degrees Celsius and less than 550 degrees Celsius; cause the temperature of the oxidation catalyst to be maintained at the first regeneration temperature for a first time period; after the first time period, cause the temperature of the oxidation catalyst to increase to a second regeneration temperature equal to or greater than 550 degrees Celsius.

In some embodiments, the oxidation catalyst criteria comprises a desulfation condition of the oxidation catalyst, and wherein the oxidation catalyst criteria being satisfied comprises the desulfation condition being satisfied.

In some embodiments, the desulfation condition comprises a concentration of sulfur in a fuel that is combusted to generate the exhaust gas, and wherein the desulfation condition being satisfied comprises the concentration of sulfur in the fuel being equal to or greater than a predetermined sulfur concentration threshold.

In some embodiments, in response to determining that the filter is to be regenerated and the desulfation condition is not satisfied, the controller is configured to: cause increase of the temperature of the oxidation catalyst to the second regeneration temperature without maintaining the oxidation catalyst at the first regeneration temperature for the first time period; and cause insertion of hydrocarbons into the oxidation catalyst.

In some embodiments, the desulfation condition comprises a measured exotherm across the oxidation catalyst, and wherein the desulfation condition being satisfied comprises the measured exotherm being outside of a predetermined range based on a reference exothermal curve.

In some embodiments, the aftertreatment system further comprises: an oxidation catalyst heater that is coupled to the oxidation catalyst and configured to be controlled by the controller to cause the temperature of the oxidation catalyst to increase and be maintained.

In some embodiments, an aftertreatment system for reducing constituents of an exhaust gas having a sulfur content, comprises: a SCR catalyst; and a controller configured to: determine a $NO_X$ conversion efficiency of the SCR catalyst; in response to the $NO_X$ conversion efficiency being less than a predetermined threshold, cause a temperature of the SCR catalyst to be increased to a first regeneration temperature that is greater than or equal to 400 degrees Celsius and less than 550 degrees Celsius; and cause the temperature of the SCR catalyst to be maintained at the first regeneration temperature for a predetermined first time period.

In some embodiments, the controller is further configured to: after the first time period, cause the temperature of the SCR catalyst to be increased to a second regeneration temperature greater than the first regeneration temperature and less than 550 degrees Celsius; and cause the temperature of the SCR catalyst to be maintained at the second regeneration temperature for a second time period.

In some embodiments, the controller is further configured to: in response to a time interval between regeneration events not satisfying a time interval threshold, cause the temperature of the SCR catalyst to be increased to a third regeneration temperature in a subsequent regeneration event, the third regeneration temperature being greater than the first regeneration temperature and less than 550 degrees Celsius; and cause the temperature of the SCR catalyst to be maintained at the third regeneration temperature for a predetermined third time period.

In some embodiments, the time interval threshold is in a range of 10 hours to 12 hours.

In some embodiments, the controller is further configured to: in response to the time interval between regeneration events not satisfying a critical time interval, cause the temperature of the SCR catalyst to be increased to a fourth regeneration temperature in a subsequent regeneration event, the fourth regeneration temperature being equal to or greater than 550 degrees Celsius.

In some embodiments, the critical time interval is 1 hour.

In some embodiments, the controller is further configured to: in response to the time interval between regeneration events continuing to not satisfy the critical time interval after the subsequent regeneration event, generate a fault code.

In some embodiments, a ratio of ammonia generated by a reductant inserted into the exhaust gas to an amount of $NO_X$ gases included in the exhaust gas flowing through the aftertreatment system is greater than 1.0.

In some embodiments, the aftertreatment system further comprises: an oxidation catalyst disposed upstream of the SCR catalyst and a hydrocarbon insertion assembly configured to insert hydrocarbons into the oxidation catalyst, wherein the controller is configured to cause the temperature of the SCR catalyst to increase by instructing the hydrocarbon insertion assembly to insert hydrocarbons into the oxidation catalyst.

In some embodiments, the aftertreatment system further comprises: a SCR catalyst heater operatively coupled to the SCR catalyst, wherein the controller is configured to instruct the selective catalytic reduction heater to increase and maintain the temperature of the SCR catalyst.

In some embodiments, the predetermined threshold comprises the $NO_X$ conversion efficiency being 90%.

In some embodiments, an aftertreatment system for reducing constituents of an exhaust gas having a sulfur content, comprises: a SCR catalyst; and a controller configured to: determine a $NO_X$ conversion efficiency of the SCR catalyst; in response to the $NO_X$ conversion efficiency being less than a first predetermined threshold, cause a temperature of the SCR catalyst to increase to a first regeneration temperature that is greater than or equal to 400 degrees Celsius and less than 550 degrees Celsius; cause the temperature of the SCR catalyst to be maintained at the first regeneration temperature for a first time period; in response to the $NO_X$ conversion efficiency being less than a second predetermined threshold that is less than the first predetermined threshold or a time interval between subsequent regeneration events at the first temperature being less than a time interval threshold, cause the temperature of the SCR catalyst to increase to a second regeneration temperature that is equal to or greater than 550 degrees Celsius; cause temperature of the SCR catalyst to be maintained at the second regeneration temperature for a second time period; and in response to the $NO_X$ conversion efficiency being less than a third predetermined threshold that is less than the second predetermined threshold, or the time interval between subsequent regeneration events at the second temperature being less than a time interval threshold, generate a fault code.

In some embodiments, the first predetermined threshold corresponds to a 90% $NO_X$ conversion efficiency, the second predetermined threshold corresponds to an 80% $NO_X$ conversion efficiency, and the third predetermined threshold corresponds to a 70% $NO_X$ conversion efficiency.

In some embodiments, the controller is further configured to: in response to a fuel tank associated with an engine that is generating the exhaust gas being refilled or a predetermined amount of fuel having been consumed, cause the temperature of the SCR catalyst to be increased to the first regeneration temperature.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
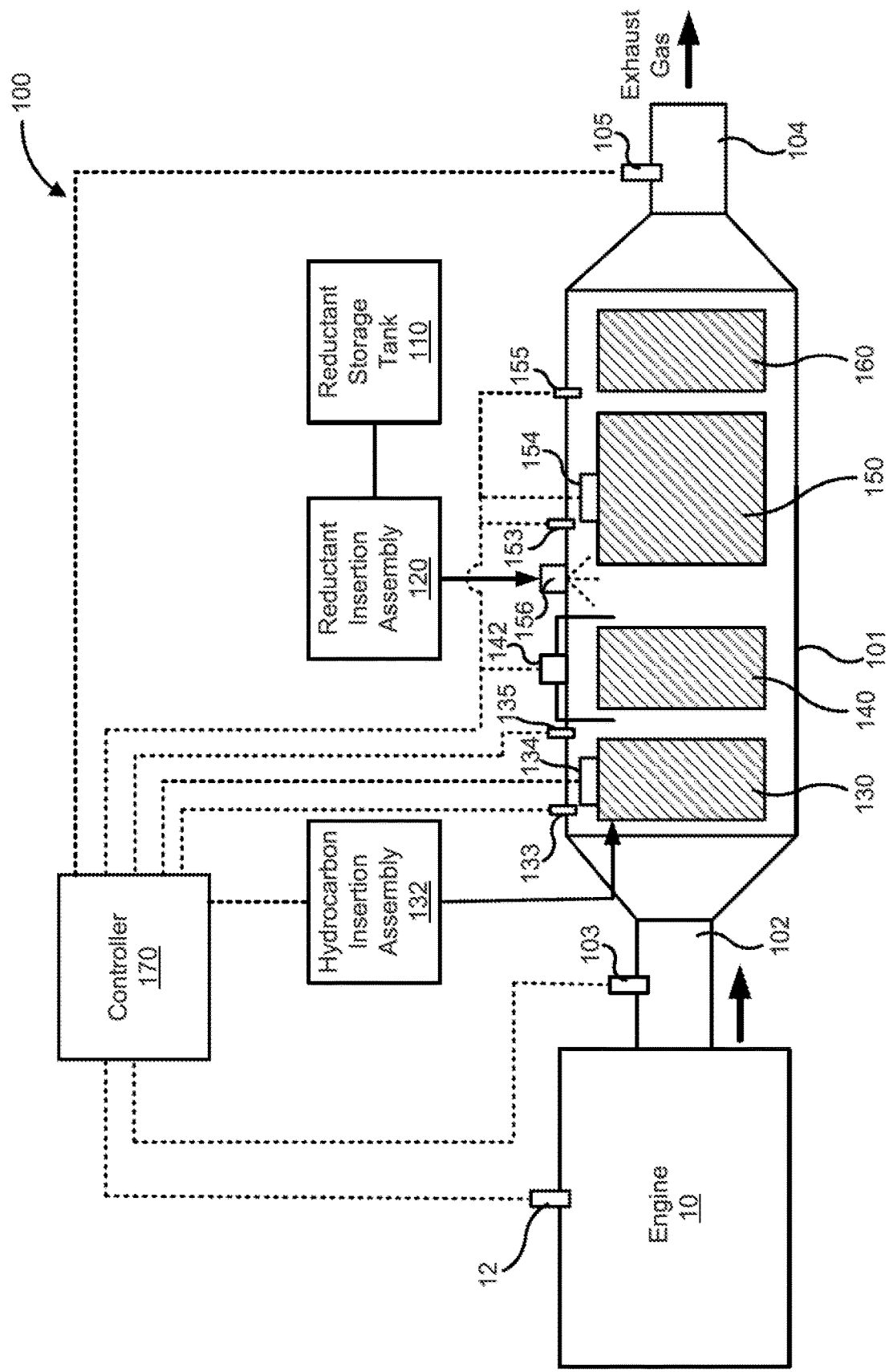
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for desulfating, i.e., removing sulfur accumulated on an oxidation catalyst or a SCR catalyst included in an aftertreatment system. In particular, systems and methods described herein include heating an oxidation catalyst or a SCR catalyst to a regeneration temperature lower than a conventional regeneration temperature so as to desulfate the oxidation catalyst or the SCR catalyst while reducing hydrothermal aging.

Aftertreatment systems may include an oxidation catalyst for decomposing CO or hydrocarbons included in an exhaust gas flowing threrethrough. Aftertreatment systems may also include a SCR catalyst for decomposing $NO_X$ gases included in the exhaust gas. Conventional aftertreatment systems are designed and certified with the expectation that they will be operated with a fuel (e.g., a diesel fuel) which has a low sulfur concentration, for example, a sulfur concentration of 15 ppm or less. However, there is a potential that diesel fuels with a higher concentration of sulfur may be used, and this can lead to a reversible deterioration of the oxidation catalyst and SCR catalyst functions in particular due to accumulation of sulfur on the oxidation catalyst and the SCR catalyst.

Sulfur regeneration of the oxidation catalyst and/or the SCR catalyst is generally performed by heating the oxidation catalyst or the SCR catalyst to a temperature equal to or greater than a high regeneration temperature, for example, equal to or greater than 550 degrees Celsius. Furthermore, regeneration of a filter (i.e., removal of accumulated soot or ash from the filter by burn off) disposed downstream of the oxidation catalyst may be performed by increasing the temperature of the exhaust gas to the high regeneration temperature (e.g., about 550 degrees Celsius or higher). This high regeneration temperature is typically achieved by inserting hydrocarbons into or on the oxidation catalyst which combust in the oxidation catalyst causing an increase in temperature of the exhaust gas. The hot exhaust gas oxidizes the soot accumulated on the downstream filter, and thereby regenerates the filter.

Figure 3:
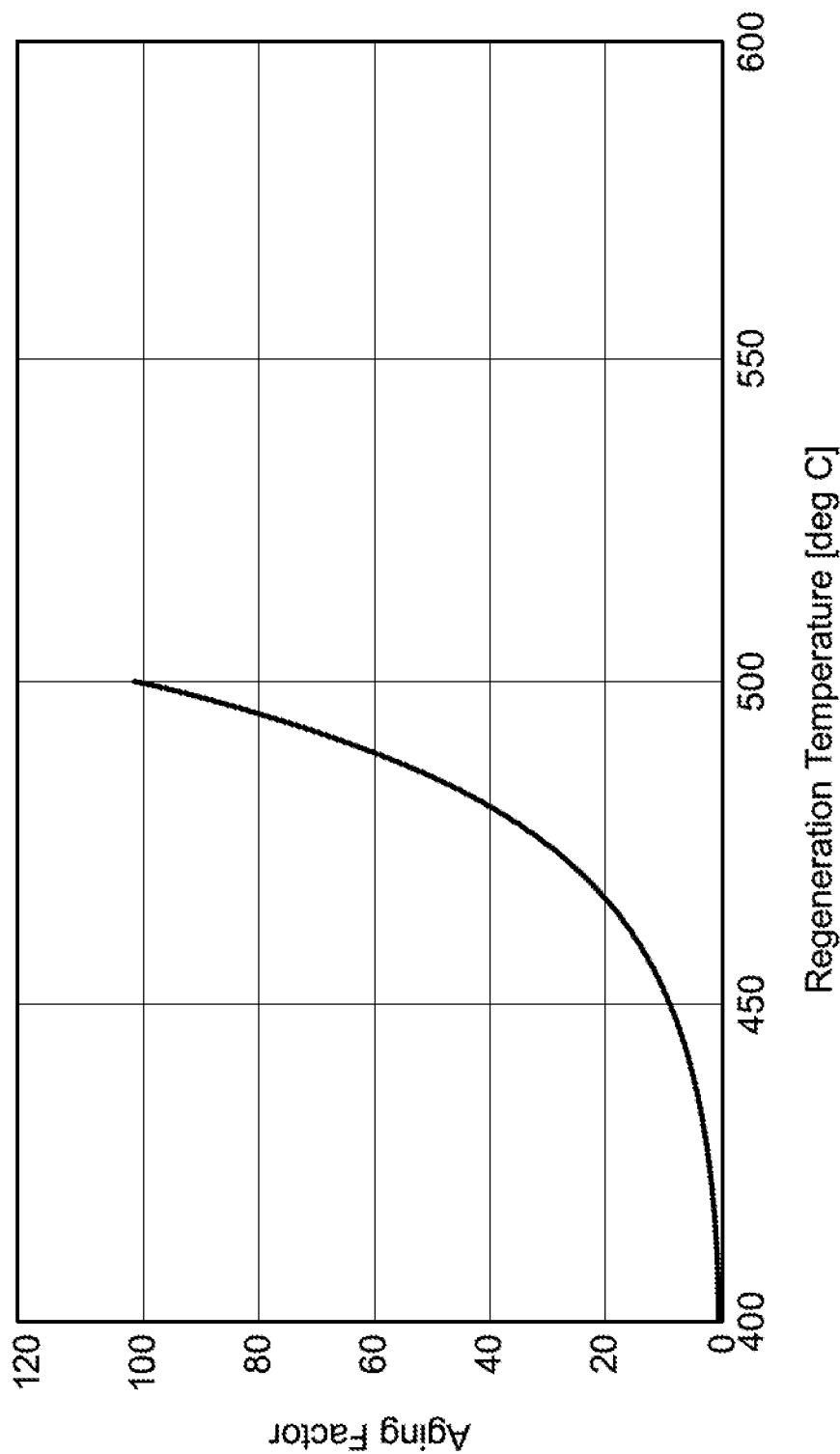
FIG. 3 shows a plot of hydrothermal aging factor of a SCR catalyst at various regeneration temperatures.

Since both sulfur regeneration and soot regeneration are both effective at this high regeneration temperature they are often performed with the same type of regeneration event. However, heating the oxidation catalyst or the SCR catalyst to the high regeneration temperature for sulfur regeneration poses several concerns. A high frequency of thermal regeneration at the high regeneration temperature can lead to rapid hydrothermal aging of the oxidation or the SCR catalyst components. As shown in FIG. 3, for an SCR catalyst, this aging factor is an exponential function of the temperature used to remove the sulfur. Hydrothermal aging may be further accelerated by the presence of sulfur on the SCR catalyst. Thus, the combination of sulfur and high temperatures can lead to faster irreversible deterioration of the $NO_X$ conversion efficiency of the SCR catalyst.

Figure 4:
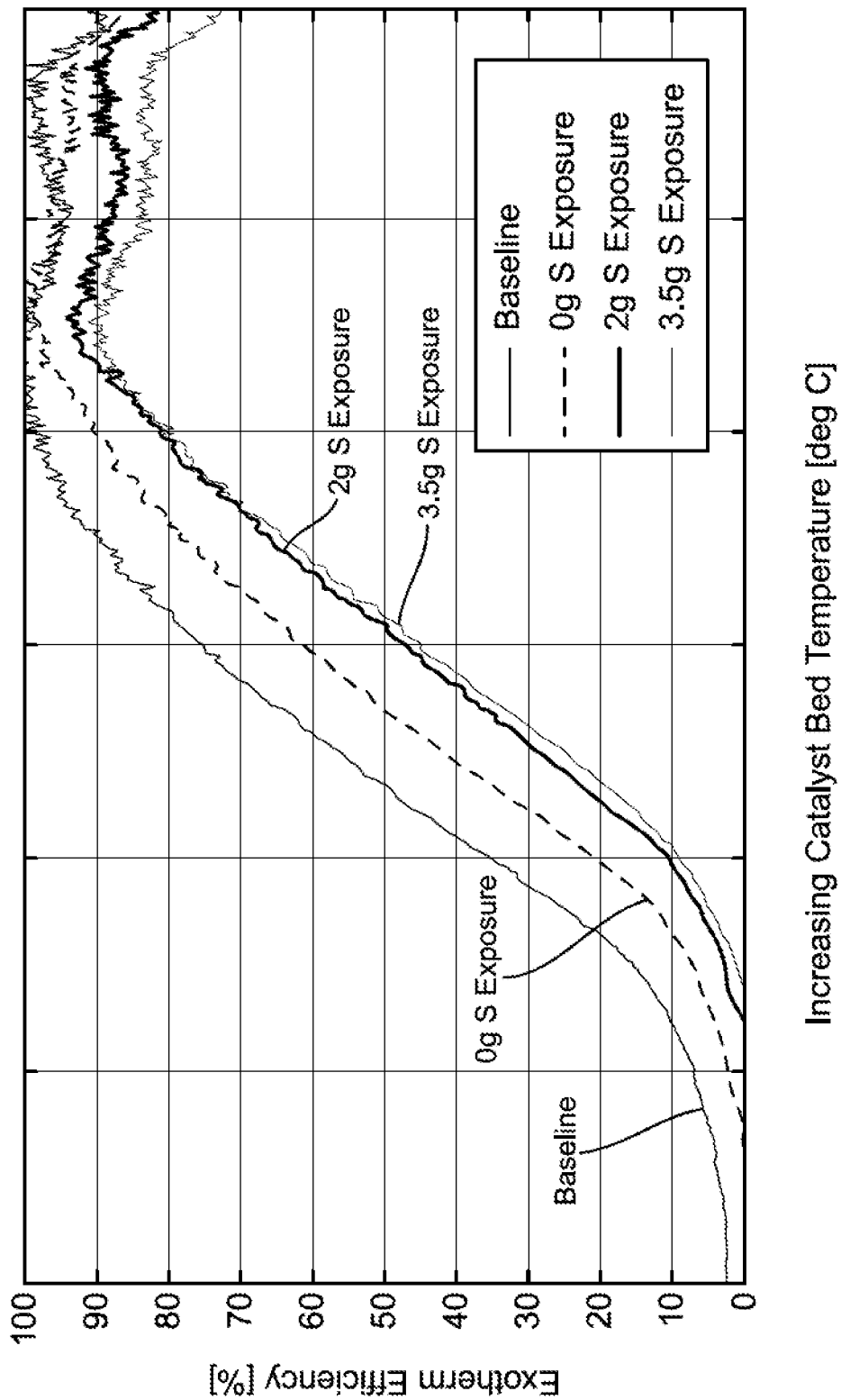
FIG. 4 shows exothermal efficiency curves across an oxidation catalyst at various cumulative sulfur exposure levels in an exhaust gas flowing therethrough at various bed temperatures of the oxidation catalyst, and highlighting a shift in light-off temperature of the oxidation catalyst.

Another challenge with sulfur exposure is that the light-off temperature of the oxidation catalyst, i.e., the temperature at which hydrocarbons inserted into the oxidation catalyst ignite, can shift to higher temperatures. For example, FIG. 4 shows exothermal efficiency curves across an oxidation catalyst and increase in light-off temperature of the oxidation catalyst when exposed to exhaust gas including increasing cumulative exposure of sulfur. This can be an issue during filter soot regeneration events from the filter where fuel is injected into the oxidation catalyst to raise a filter inlet temperature to a target regeneration temperature. If the inlet temperature of the oxidation catalyst is below the light-off temperature, then unburned fuel can pass into the filter, which can lead to thermal damage of the filter. Removing sulfur from the oxidation catalyst prior to a filter regeneration event can help to mitigate this issue. While the oxidation catalyst and the SCR catalyst can be made larger so that they take longer to be impacted by exhaust gas including a high sulfur content, this increases the cost of the aftertreatment system and may also increase packaging complexity.

In contrast, various embodiments of the systems and methods described herein for desulfating an oxidation and/or a SCR catalyst may provide one or more benefits including, for example: (1) desulfating an oxidation catalyst and/or a SCR catalyst by heating to a temperature lower than a high regeneration temperature (i.e., less than 550 degrees Celsius) so as to limit aging of the respective catalysts; (2) preventing increase in light-off temperature of the oxidation catalyst, therefore protecting a downstream filter from being exposed to unburnt hydrocarbons; (3) avoiding overdesign of the oxidation catalyst or the SCR catalyst while preventing thermal aging; (4) allowing operation of aftertreatment systems with engines consuming high sulfur content fuels, e.g., up to 50 ppm sulfur; and (5) increasing catalyst life, thereby reducing maintenance and warranty costs.

FIG. 1 is a schematic illustration of an aftertreatment system 100, according to an embodiment. The aftertreatment system 100 is configured to receive an exhaust gas from an engine 10 (e.g., a diesel engine, a gasoline engine, a natural gas engine, a dual fuel engine, a biodiesel engine, an E-85 engine, or any other suitable engine) and reduce constituents of the exhaust gas such as, for example, $NO_X$ gases, CO, hydrocarbons, etc. In some embodiments, the fuel consumed by the engine 10 may include a fuel having a high sulfur concentration, for example, greater than 15 ppm. (e.g., a high sulfur concentration diesel fuel). The aftertreatment system 100 may comprise a reductant storage tank 110, a reductant insertion assembly 120, a housing 101, an oxidation catalyst 130, a filter 140, a SCR catalyst 150 and a controller 170. In some embodiments, the aftertreatment system 100 may also include a hydrocarbon insertion assembly 132, and an ammonia oxidation ($AMO_x$) catalyst 160.

The housing 101 defines an internal volume within which the oxidation catalyst 130, the filter 140, the SCR catalyst 150, and the $AMO_x$ catalyst 160 are disposed. The housing 101 may be formed from a rigid, heat-resistant and corrosion-resistant material, for example, stainless steel, iron, aluminum, metals, ceramics, or any other suitable material. The housing 101 may have any suitable cross-section, for example, circular, square, rectangular, oval, elliptical, polygonal, or any other suitable shape.

An inlet conduit 102 is fluidly coupled to an inlet of the housing 101 and structured to receive exhaust gas from the engine 10 and communicate the exhaust gas to an internal volume defined by the housing 101. Furthermore, an outlet conduit 104 may be coupled to an outlet of the housing 101 and structured to expel treated exhaust gas into the environment (e.g., treated to remove particulate matter such as soot by the filter 140 and/or reduce constituents of the exhaust gas such as $NO_X$ gases, CO, unburnt hydrocarbons, etc. included in the exhaust gas).

A first sensor 103 may be positioned in the inlet conduit 102. The first sensor 103 may comprise a $NO_X$ sensor configured to measure an amount of $NO_X$ gases included in the exhaust gas flowing into the SCR catalyst 150 and may include a physical sensor or a virtual sensor. In various embodiments, a temperature sensor, a pressure sensor, an oxygen sensor or any other sensor may also be positioned in the inlet conduit 102 so as to determine one or more operational parameters of the exhaust gas flowing through the aftertreatment system 100.

A second sensor 105 may be positioned in the outlet conduit 104. The second sensor 105 may comprise a second $NO_X$ sensor configured to determine an amount of $NO_X$ gases expelled into the environment after passing through the SCR catalyst 150. In other embodiments, the second sensor 105 may comprise a particulate matter sensor configured to determine an amount of particulate matter (e.g., soot included in the exhaust gas exiting the filter 140) in the exhaust gas being expelled into the environment. In still other embodiments, the second sensor 105 may comprise an ammonia sensor configured to measure an amount of ammonia in the exhaust gas flowing out of the SCR catalyst 150, i.e., determine the ammonia slip. This may be used as a measure of determining a catalytic efficiency of the SCR catalyst 150, adjust an amount of reductant to be inserted into the SCR catalyst 150, and/or adjust a temperature of the SCR catalyst 150 so as to allow the SCR catalyst 150 to effectively use the ammonia for catalytic decomposition of the $NO_X$ gases included in the exhaust gas flowing therethrough. The ammonia oxide ($AMO_x$) catalyst 160 may be positioned downstream of the SCR catalyst 150 so as to decompose any unreacted ammonia in the exhaust gas downstream of the SCR catalyst 150.

The oxidation catalyst 130 is positioned downstream of the inlet conduit 102 and fluidly coupled thereto, so as to receive the exhaust gas therefrom. The oxidation catalyst 130 may be configured to decompose unburnt hydrocarbons and/or CO included in the exhaust gas. In particular embodiments, the oxidation catalyst 130 comprises a diesel oxidation catalyst. An oxidation catalyst inlet temperature sensor 133 may be positioned upstream of the oxidation catalyst 130 and configured to determine an inlet temperature of the exhaust gas entering the oxidation catalyst 130. An oxidation catalyst outlet temperature sensor 135 may be positioned downstream of the oxidation catalyst 130 and configured to determine an outlet temperature of the exhaust gas exiting the oxidation catalyst 130. An oxidation catalyst heater 134 may be coupled to the oxidation catalyst 130 and configured to selectively heat the oxidation catalyst 130 to a predetermined temperature, for example, a low regeneration temperature (e.g., greater than or equal to 400 degrees Celsius and less than 550 degrees Celsius) or a high regeneration temperature (e.g., equal to or greater than 550 degrees Celsius).

The filter 140 is disposed downstream of the oxidation catalyst 130 and configured to remove particulate matter (e.g., soot, debris, inorganic particles, etc.) from the exhaust gas. In various embodiments, the filter 140 may include a ceramic filter. In some embodiments, the filter 140 may include a cordierite filter that can, for example, be an asymmetric filter. In yet other embodiments, the filter 140 may be catalyzed.

Furthermore, the hydrocarbon insertion assembly 132 may be coupled to the housing 101 and configured to selectively insert hydrocarbons onto the oxidation catalyst 130. The oxidation catalyst 130 is formulated to catalyze ignition of the hydrocarbons when the inlet temperature 133 of the oxidation catalyst 130 is heated above a light-off temperature (>275-300 degrees Celsius) of the hydrocarbons inserted into the oxidation catalyst 130 so as to increase the outlet temperature of the exhaust gas to a high temperature (e.g., 550 degrees Celsius) sufficient to burn off soot accumulated on the filter 140 so as to regenerate the filter 140, or a low oxidation catalyst outlet temperature (400-550 degrees Celsius) in order to perform a sulfur regeneration of the SCR catalyst.

The SCR catalyst 150 is formulated to decompose constituents of an exhaust gas flowing therethrough in the presence of a reductant, as described herein. In some embodiments, the filter 140 could be removed and the SCR catalyst 150 may include a selective catalytic reduction filter (SCRF). Any suitable SCR catalyst 150 may be used such as, for example, platinum, palladium, rhodium, cerium, iron, manganese, copper, vanadium based catalyst, any other suitable catalyst, or a combination thereof. The SCR catalyst 150 may be disposed on a suitable substrate such as, for example, a ceramic (e.g., cordierite) or metallic (e.g., kanthal) monolith core which can, for example, define a honeycomb structure. A washcoat can also be used as a carrier material for the SCR catalyst 150. Such washcoat materials may comprise, for example, aluminum oxide, titanium dioxide, silicon dioxide, any other suitable washcoat material, or a combination thereof.

The exhaust gas (e.g., diesel exhaust gas) can flow over and/or about the SCR catalyst 150 such that any $NO_X$ gases included in the exhaust gas are further reduced to yield an exhaust gas that is substantially free of $NO_X$ gases. A SCR catalyst temperature sensor 153 may be positioned proximate to (e.g., upstream of) the SCR catalyst 150 and configured to determine a temperature of the exhaust gas entering the SCR catalyst 150. A second SCR catalyst temperature sensor 155 may be located downstream of the SCR catalyst 150 or the $AMO_x$ catalyst 160 and configured to determine the SCR catalyst 150 temperature, for example, a temperature of the exhaust gas downstream of the SCR catalyst 150. When reference is made to the SCR catalyst 150 temperature, it may be determined via the first SCR catalyst temperature sensor 153, the second SCR catalyst temperature sensor 155, or a virtual representation calculated from one or both sensors. A SCR catalyst heater 154 may be coupled to the SCR catalyst 150 and configured to selectively heat the SCR catalyst 150 to a predetermined temperature (e.g., greater than or equal to 400 degrees Celsius and less than 550 degrees Celsius) or a high regeneration temperature (e.g., equal to or greater than 550 degrees Celsius).

Although FIG. 1 shows only the oxidation catalyst 130, the filter 140, the SCR catalyst 150 and the $AMO_x$ catalyst 160 positioned within the internal volume defined by the housing 101, in other embodiments, a plurality of aftertreatment components may be positioned within the internal volume defined by the housing 101 in addition to the oxidation catalyst 130, the filter 140, the SCR catalyst 150 and the $AMO_x$ catalyst 160. Such aftertreatment components may comprise, for example, mixers, baffle plates, secondary filters (e.g., a secondary partial flow or catalyzed filter) or any other suitable aftertreatment component.

A reductant port 156 may be positioned on a sidewall of the housing 101 and structured to allow insertion of a reductant therethrough into the internal volume defined by the housing 101. The reductant port 156 may be positioned upstream of the SCR catalyst 150 (e.g., to allow reductant to be inserted into the exhaust gas upstream of the SCR catalyst 150) or over the SCR catalyst 150 (e.g., to allow reductant to be inserted directly on the SCR catalyst 150). In other embodiments, the reductant port 156 may be disposed on the inlet conduit 102 and configured to insert the reductant into the inlet conduit 102 upstream of the SCR catalyst 150. In such embodiments, mixers, baffles, vanes, or other structures may be positioned in the inlet conduit 102 so as to facilitate mixing of the reductant with the exhaust gas.

The reductant storage tank 110 is structured to store a reductant. The reductant is formulated to facilitate decomposition of the constituents of the exhaust gas (e.g., $NO_X$ gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water, including 40% by volume of urea and 60% by volume of deionized water, or any other suitable ratio of urea to deionized water.

A reductant insertion assembly 120 is fluidly coupled to the reductant storage tank 110. The reductant insertion assembly 120 is configured to selectively insert the reductant into the SCR catalyst 150 or upstream thereof (e.g., into the inlet conduit 102) or a mixer (not shown) positioned upstream of the SCR catalyst 150. The reductant insertion assembly 120 may comprise various structures to facilitate receipt of the reductant from the reductant storage tank 110 and delivery to the SCR catalyst 150, for example, pumps, valves, screens, filters, etc.

The aftertreatment system 100 may also comprise a reductant injector fluidly coupled to the reductant insertion assembly 120 and configured to insert the reductant (e.g., a combined flow of reductant and compressed air) into the SCR catalyst 150. In various embodiments, the reductant injector may comprise a nozzle having predetermined diameter. In various embodiments, the reductant injector may be positioned in the reductant port 156 and structured to deliver a stream or a jet of the reductant into the internal volume of the housing 101 so as to deliver the reductant to the SCR catalyst 150.

The controller 170 may be communicatively coupled to the first sensor 103 and may be configured to receive a first sensor signal from the first sensor 103, for example, to determine an amount of $NO_X$ gases included in the exhaust gas entering the aftertreatment system. The controller 170 may also be communicatively coupled to the second sensor 105 and may be configured to determine a concentration of $NO_X$ gases or ammonia included in the exhaust gas being expelled into the environment. The controller 170 may also be coupled to the oxidation catalyst temperature sensors 133 and 135, and the SCR catalyst temperature sensors 153 and 155 and configured to receive temperature signals therefrom to determine a temperature of the exhaust gas entering and exiting the oxidation catalyst 130 or the SCR catalyst 150, respectively. The controller 170 may also be coupled to the oxidation catalyst heater 134 and the SCR catalyst heater 154 and configured to selectively activate the heater 134 or 154 so as to heat the oxidation catalyst 130 and the SCR catalyst 150 to a predetermined temperature, respectively. The controller 170 may be operably coupled to the various components of the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

In some embodiments, the controller 170 may be configured to determine if the filter 140 is to be regenerated, and whether an oxidation catalyst criterion is satisfied. For example, the controller 170 may be configured to receive a signal from the filter 140, for example, a pressure signal from a differential pressure sensor 142 positioned across the filter 140 and estimate the soot loading within the filter 140. For example, in response to a differential pressure across the filter 140 exceeding a predetermined pressure threshold which corresponds to a soot loading within the filter 140 exceeding a soot loading threshold, the controller 170 may determine that the filter 140 should be regenerated.

In response to determining that the filter 140 is to be regenerated and the oxidation catalyst criteria is satisfied, the controller 170 is configured to cause an outlet temperature of the oxidation catalyst 130 to be increased to a low or first regeneration temperature, for example, greater than or equal to 400 degrees Celsius and less than 550 degrees Celsius, inclusive. For example, the controller 170 may inject hydrocarbons via the hydrocarbon insertion assembly 132 into the oxidation catalyst 130 in order to raise the exhaust temperature. In another embodiment, the controller 170 may be configured to command the hydrocarbon insertion assembly 132 to insert hydrocarbons into the engine 10 to increase the temperature of the exhaust gas and thus the oxidation catalyst 130. In still another embodiment, the controller 170 may activate the oxidation catalyst heater 134 such that the oxidation catalyst heater 134 ramps a temperature of the oxidation catalyst 130 to the low regeneration temperature. The controller 170 is configured to cause the temperature of the oxidation catalyst 130 to be maintained at the low regeneration temperature for a predetermined time period, for example, 15 minutes, 20 minutes, 25 minutes or 30 minutes inclusive of all ranges and values therebetween. The low regeneration temperature and the predetermined time period is sufficient to desulfate the oxidation catalyst 130, i.e., remove sulfur accumulated on a surface of the oxidation catalyst 130.

Figure 5:
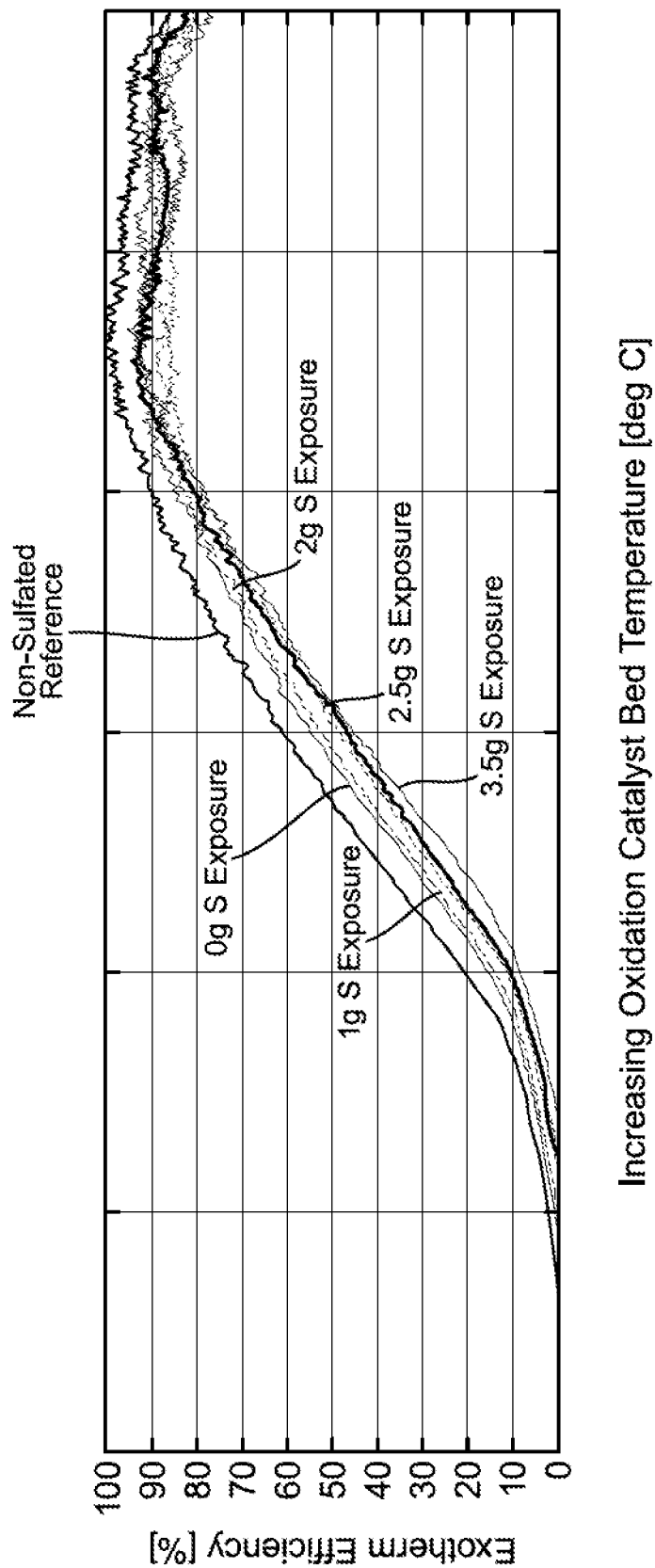
FIG. 5 shows exothermal efficiency curves of the oxidation catalyst exposed to various cumulative sulfur exposure levels highlighting recovery of lower light-off temperature of the oxidation catalyst after desulfation.

Removal of sulfur from the oxidation catalyst 130 shifts a light-off temperature of hydrocarbons by the oxidation catalyst 130 (i.e., a temperature at which hydrocarbons inserted into the oxidation catalyst 130 ignite) towards a light-off temperature of a non-sulfated oxidation catalyst, for example, a fresh oxidation catalyst that has not been exposed to sulfur. For example, FIG. 5 shows exothermal efficiency curves across a non-sulfated reference oxidation catalyst compared to exothermal efficiency curves across a sulfated oxidation catalyst that has been exposed to various cumulative sulfur levels after being heated to different low regeneration temperatures. Regenerating the oxidation catalyst shifts the exothermal efficiency curves of the sulfated oxidation catalyst towards the non-sulfated reference.

After the first time period, the controller 170 is further configured to cause the outlet temperature of the oxidation catalyst 130 to increase to a high or second regeneration temperature, for example, equal to or greater than 550 degrees Celsius, by instructing the hydrocarbon insertion assembly 132 to increase the quantity of hydrocarbons inserted into the oxidation catalyst 130 until the target is reached. The hydrocarbons light-off or ignite on the regenerated oxidation catalyst 130 and increase a temperature of the exhaust gas that is sufficient to oxidize the particulate matter accumulated on the downstream filter 140, thereby regenerating the filter 140.

In some embodiments, the oxidation catalyst criteria may include a desulfation condition. For example, the controller 170 may be configured to determine if a desulfation condition is satisfied, and is configured to cause the temperature of the oxidation catalyst 130 to increase to the low regeneration temperature in response to the desulfation condition being satisfied. In some embodiments, the desulfation condition includes a concentration of sulfur in a fuel that is being combusted in the engine 10 to generate the exhaust gas, and the desulfation condition being satisfied includes the concentration of sulfur in the exhaust gas being equal to or greater than a predetermined sulfur concentration threshold, for example, 15 ppm sulfur in fuel. For example, the controller 170 may be coupled to a sulfur sensor 12 that is coupled to the engine 10 or a fuel tank of the engine 10 and configured to determine a concentration of sulfur in the fuel.

In other embodiments, the first sensor 103 may be configured to detect a concentration of $SO_X$ gases in the exhaust gas that corresponds to a concentration of sulfur in the fuel, and the controller 170 may be configured to determine the concentration of sulfur in the fuel based on the signal received from the first sensor 103. In still other embodiments, the signal may be received from a virtual sensor (e.g., a signal received from a central controller of a system including the engine 10 that determines the concentration of sulfur in the fuel based on operating parameters of the engine 10 or the aftertreatment system 100). As previously described herein, a high sulfur content in the fuel or in the exhaust gas leads to the oxidation catalyst 130 becoming sulfated, and therefore desulfation, i.e., removal of sulfur accumulated on the oxidation catalyst 130, would be beneficial to prevent a shift in light-off temperature of the oxidation catalyst 130.

Thus, once the controller 170 determines that a high sulfur fuel (e.g., having a sulfur concentration greater than 15 ppm) is being used in the engine 10 (e.g., based on the fuel being filled into a fuel tank associated with the engine 10 in a last tank filling), the controller 170 initiates the low temperature regeneration cycle for the oxidation catalyst 130. On the contrary, if the desulfation condition is not satisfied, for example, a low sulfur fuel is being used, the controller 170 may determine that an oxidation catalyst regeneration is not desired. In such embodiments, when the controller 170 detects a soot filter regeneration is desired, the controller 170 may be configured to cause the temperature of the oxidation catalyst 130 to increase the high regeneration temperature without maintaining the oxidation catalyst at the low regeneration temperature, and insert hydrocarbons into the oxidation catalyst 130 to regenerate the filter 140, as previously described herein.

In some embodiments, the degree of sulfur saturation of the oxidation catalyst 130 may be evaluated via the exothermal efficiency curve across the oxidation catalyst 130. The reference exothermal efficiency curve indicates an expected temperature increase profile across the oxidation catalyst 130 for a given reductant injection quantity for a non-sulfated oxidation catalyst. The reference exothermal efficiency curve may be stored in the form of a lookup table, algorithm or equation in a memory of the controller 170. In some embodiments, the desulfation condition being satisfied may include the measured exotherm being outside of a predetermined range. For example, if the oxidation catalyst 130 is sulfated, the measured exotherm thereof may be smaller than the exothermal efficiency curve of a non-sulfated oxidation catalyst, due to the light-off temperature of the oxidation catalyst 130 increasing due to sulfur accumulation thereon. In response to the measured exotherm being outside the predetermined range, the controller 170 may initiate the low temperature regeneration cycle of the oxidation catalyst 130 for the predetermined time period, before initiating the high temperature regeneration cycle. Otherwise, the controller 170 may initiate a high temperature regeneration cycle.

In some embodiments, the controller 170 may also be configured to selectively cause regeneration of the SCR catalyst 150. A high sulfur fuel content may also cause accumulation of sulfur on the SCR catalyst 150 causing reduction in $NO_X$ conversion efficiency of the SCR catalyst 150. As previously described herein, the SCR catalyst 150 may be regenerated at a high regeneration temperature, for example, approximately 550 degrees Celsius. However, high temperature regeneration can thermally age the SCR catalyst 150 and reduce its life as previously described herein. To prevent thermal aging of the SCR catalyst 150, the controller 170 may be configured to cause regeneration of the SCR catalyst 150 using a low regeneration temperature regeneration where the injected ammonia is in a ratio greater than or equal to the incoming $NO_X$, or ammonia to $NO_X$ Ratio (ANR)>1.0, instead of a high temperature regeneration cycle.

Figure 6A:
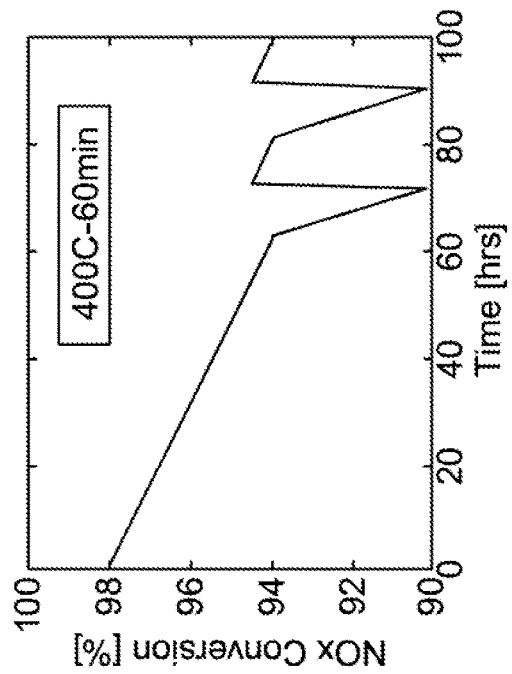
FIGS. 6A-6D shows simulation plots of time vs $NO_X$ conversion efficiency of a SCR catalyst based upon measured sulfur release data showing a regeneration frequency for meeting a target $NO_X$ conversion level with different temperatures and time sulfur removal strategies assuming operation on 50 ppm sulfur fuel over an example duty cycle.
Figure 6B:
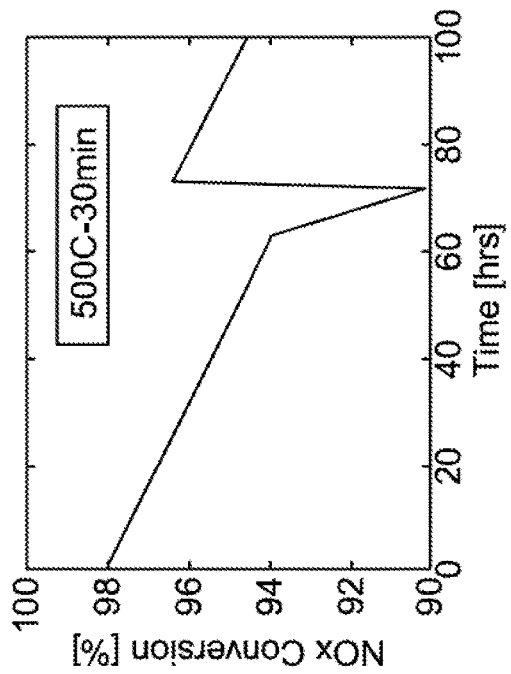

For example, FIGS. 6A-6D show simulated plots that demonstrate the impact of sulfur removal regeneration events on regeneration of $NO_X$ conversion efficiency of a sulfur catalyst at different regeneration temperatures and for different regeneration times. If the ammonia to $NO_X$ ratio is greater than 1.0, then some sulfur can be removed with an SCR catalyst 150 inlet temperature of 400 degrees Celsius (FIGS. 6A-6B). The ammonia to $NO_X$ ratio can be controlled by controlling a quantity of reductant inserted into the exhaust gas based on the quantity of $NO_X$ gases present in the exhaust gas. In conventional regeneration events, the SCR catalyst is heated at the high regeneration temperature for a predetermined time period (e.g., 30-60 minutes) to desulfate the SCR catalyst. In contrast, the regeneration events shown in FIGS. 6A-6B are performed at the low regeneration temperature, therefore less sulfur is removed during the same time period. For example, in FIG. 6A, regeneration is performed at 400 degrees Celsius for 30 minutes, which removes sufficient sulfur from the SCR catalyst to increase the $NO_X$ conversion efficiency of the catalyst to approximately 94%. The SCR catalyst starts to sulfate again and once the $NO_X$ conversion efficiency hits a threshold (e.g., 90% $NO_X$ conversion efficiency, the 400 degrees Celsius regeneration event is performed again for 30 minutes and so on. FIG. 6B is similar to FIG. 6A, the only difference being that the low temperature regeneration event is performed at 400 degrees Celsius for 60 minutes. At 450 degrees Celsius (FIG. 6C) additional sulfur can be removed, and even more at 500 degrees Celsius (FIG. 6D) leading to a further reduction in regeneration frequency.

The controller 170 is configured to determine a $NO_X$ conversion efficiency of the SCR catalyst 150. For example, controller 170 may be configured to receive a $NO_X$ signal from the first sensor 103 and the second sensor 105 and determine a $NO_X$ conversion efficiency of the SCR catalyst 150 therefrom. In response to the $NO_X$ conversion efficiency of the SCR catalyst 150 being less than a predetermined threshold, the controller 170 is configured to cause a temperature of the SCR catalyst 150 to increase to a first regeneration temperature greater than or equal to 400 degrees Celsius and less than 550 degrees Celsius, and cause the SCR catalyst 150 to be maintained at the first regeneration temperature for a predetermined time period.

For example, the predetermined threshold may correspond to the SCR catalyst 150 performing at a 90% $NO_X$ conversion efficiency. This may indicate to the controller 170 that the SCR catalyst 150 is to be regenerated. The controller 170 may instruct the hydrocarbon insertion assembly 132 to inject hydrocarbon into the oxidation catalyst 130 to raise the oxidation catalyst 130 outlet temperature and thereby the SCR inlet exhaust gas temperature to the first regeneration temperature or utilize an SCR catalyst heater 154 to heat the SCR catalyst 150 to the first regeneration temperature, for example, greater than or equal to 400 degree Celsius and less than 550 degrees Celsius (which is lower than a conventional high regeneration temperature of, for example, 550 degrees Celsius or greater), and to maintain the SCR catalyst 150 at the first regeneration temperature for the predetermined time period (e.g., approximately 30-60 minutes). This will reduce hydrothermal aging impact on the SCR catalyst 150. The first regeneration temperature may cause at least partial regeneration of the SCR catalyst 150 resulting in an increase in $NO_X$ conversion efficiency thereof above the predetermined threshold. For example, as shown in FIGS. 6A and 6B, a 30 minute regeneration at 400 degrees Celsius causes an increase in a $NO_X$ conversion efficiency of an SCR catalyst to about 94% and a 60 minute regeneration at 400 degrees Celsius causes an increase in a $NO_X$ conversion efficiency of an SCR catalyst to about 95% over an example duty cycle.

Figure 6C:
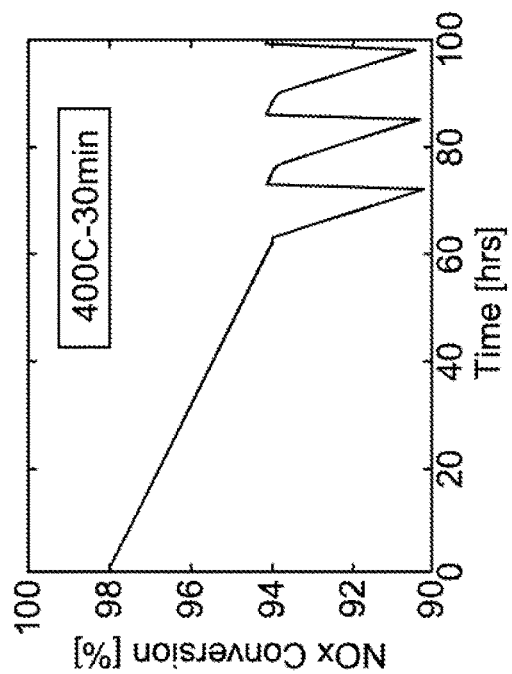
Figure 6D:
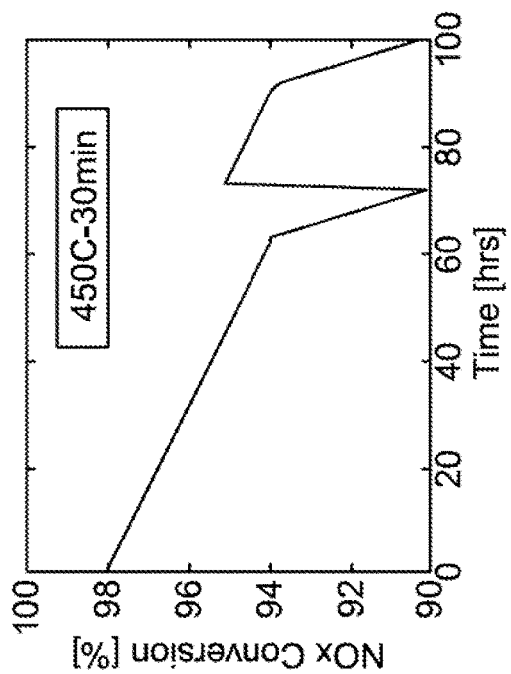

In some embodiments, in response to the $NO_X$ conversion efficiency of the SCR catalyst 150 being less than a predetermined threshold, the controller 170 is configured to cause a temperature of the SCR catalyst 150 to be increased to a first regeneration temperature (e.g., in a range of 400-450 degrees Celsius) for a predetermined first time period, and subsequently to cause the temperature of the SCR catalyst 150 to be increased to a second regeneration temperature (e.g., in a range of 450 to less than 550 degrees Celsius) which is greater than the first regeneration temperature and less than 550 degrees Celsius (e.g., in a range of 450 to less than 550 degrees Celsius). The controller 170 maintains the SCR catalyst 150 at the second regeneration temperature for a predetermined second time period. For example, as shown in FIGS. 6C and 6D, the controller 170 may be configured to heat the SCR catalyst to 400 degrees Celsius for the predetermined first time period (30 minutes or 60 minutes as shown in FIGS. 6A and 6B, respectively) and then ramp up to 450 degrees Celsius (FIG. 6C) or 500 degrees Celsius (FIG. 6D) for a short period of time (e.g., 10-15 minutes) to cause a higher increase in $NO_X$ conversion efficiency of the SCR catalyst 150.

In some embodiments, in response to a time interval between regeneration events not satisfying a minimum time interval threshold, the controller 170 is configured to cause the temperature of the SCR catalyst 150 to be increased to a third regeneration temperature in a subsequent regeneration event. The third regeneration temperature is greater than the first regeneration temperature and less than 550 degrees Celsius, and in some embodiments, may be equal to the second regeneration temperature. The controller 170 causes the temperature of the SCR catalyst 150 to be maintained at the third regeneration temperature for a predetermined third time period. For example, if the $NO_X$ conversion efficiency of the SCR catalyst 150 falls below the predetermined threshold in less than the time interval threshold (e.g., about 10-12 hours), the controller 170 may determine that regeneration at the first regeneration temperature (e.g., 400 degrees Celsius) is not sufficient to recover $NO_X$ conversion efficiency of the SCR catalyst 150 for at least the time interval threshold (e.g., 10-12 hours) before the $NO_X$ conversion efficiency drops below the threshold. Thus, the controller 170 may cause the SCR catalyst 150 to be heated to the third regeneration temperature (e.g., 500 degrees Celsius), and cause the SCR catalyst 150 to be maintained at the third regeneration temperature for the predetermined third time period, for example, for 30 minutes at 500 degrees Celsius as shown in FIG. 6D. Heating the SCR catalyst 150 to the higher third regeneration temperature may recover more of the $NO_X$ conversion efficiency and therefore, reduce the probability that the $NO_X$ conversion efficiency of the SCR catalyst 150 will fall below the predetermined threshold within the time interval threshold.

In some embodiments, in response to the time interval between regeneration events not satisfying a critical time interval, the controller 170 may be configured to cause the temperature of the SCR catalyst 150 to be increased to a fourth regeneration temperature (e.g., equal to or greater than 550 degrees Celsius) in a subsequent regeneration event. The critical time interval is shorter than the time interval threshold. In some embodiments, the critical time interval is approximately 1 hours. For example, in situations where the fuel has a concentration of sulfur that is equal to or greater than a critical sulfur level threshold (e.g., sulfur concentration equal to or greater than 500 μm), the low temperature regeneration events for desulfating the SCR catalyst 150 may start occurring very frequently, such that regaining $NO_X$ conversion efficiency occurs at a slower rate than sulfur accumulation due to the high sulfur concentration in the fuel. Thus, the $NO_X$ conversion efficiency of the SCR catalyst 150 degrades very quickly as sulfur accumulates on the SCR catalyst 150 as quickly as sulfur is removed from the SCR catalyst 150.

The controller 170 may be configured such that, if the regeneration events start occurring between time intervals equal to or less than the critical time interval, the controller 170 initiates a standard desulfating event at the fourth regeneration temperature (e.g., 550 degrees Celsius or higher). In some embodiments, in response to the time interval between regeneration events continuing to not satisfy the critical time interval after the subsequent regeneration event, the controller 170 generates a fault code, and/or light a malfunction indicator lamp (MIL) so as to indicate to a user that the fuel has a very high sulfur content. In such embodiments, the controller 170 may be configured to stop attempting the low or high temperature regeneration of the SCR catalyst 150 until the controller 170 receives a signal that the fuel tank associated with the engine 10 has been refilled, or if a quantity of the fuel corresponding to a volume of the fuel tank has been consumed.

In some embodiments, the controller 170 may be configured to initiate the low temperature regeneration of the SCR catalyst 150 in response to the $NO_X$ conversion efficiency of the SCR catalyst 150 being equal to or less than the predetermined threshold, as previously described herein. In other embodiments, the controller 170 may be configured to initiate the low temperature regeneration of the SCR catalyst 150 in response to a sulfur signal received from the sulfur sensor 12 (e.g., a physical or virtual sensor) corresponding to a concentration of sulfur in the fuel being greater than a high sulfur concentration (e.g., greater than 15 ppm) but less than the critical sulfur level threshold (e.g., 500 ppm). If the sulfur concentration is greater than the critical sulfur level threshold, the controller 170 generates the fault code and/or lights a MIL until the fuel in the fuel tank is consumed or the fuel tank is refilled.

Figure 7:
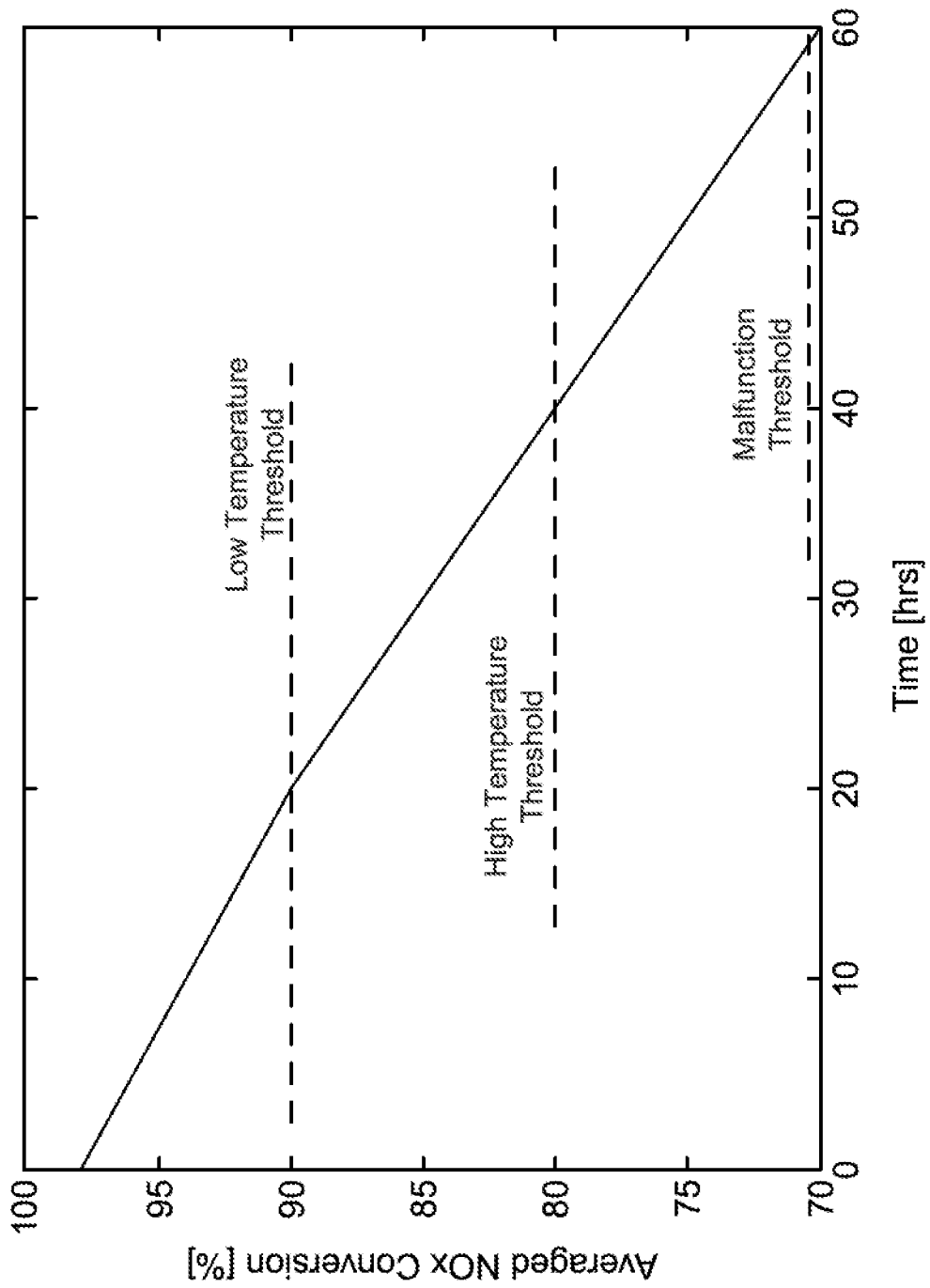
FIG. 7 shows an example plot of various $NO_X$ conversion efficiency thresholds for triggering low temperature regeneration or high temperature regeneration of a SCR catalyst, or generating a fault code indicating that the fuel has critically high sulfur concentrations or the SCR has deactivation that is not related to high sulfur fuel.

In still other embodiments, the controller 170 may be configured to initiate low temperature or high temperature events based on the detected $NO_X$ conversion efficiency of the SCR catalyst 150. For example, FIG. 7 shows various $NO_X$ conversion efficiency threshold levels for triggering different temperature SCR catalyst 150 regeneration events. These $NO_X$ conversion efficiencies of the SCR catalyst 150 would be determined at specific conditions of flow rate and temperature of the exhaust gas, and may be a time averaged signal. As shown in FIG. 7, if the $NO_X$ conversion efficiency of the SCR catalyst 150 drops to a first predetermined threshold (e.g., a low temperature threshold), for example, 90% $NO_X$ conversion efficiency, the controller 170 may be configured to initiate a low temperature regeneration event (e.g., greater than or equal to 400 degree Celsius and less than 550 degrees Celsius). In response to the $NO_X$ conversion efficiency dropping to a second predetermined threshold (e.g., a high temperature threshold) that is less than the first predetermined threshold, for example, 80% $NO_X$ conversion efficiency (e.g., after a predetermined time interval), the controller 170 may be configured to initiate a high temperature regeneration event (e.g., at 550 degrees Celsius or higher). Furthermore, if the $NO_X$ conversion efficiency continues to a drop to a third predetermined threshold (e.g., a malfunction threshold) that is less than the second predetermined threshold, for example, 70% $NO_X$ conversion efficiency, the controller 170 may be configured to generate a fault code and/or light a MM, and further regeneration events are stopped until the fuel tank is refilled or a predetermined amount of fuel has been consumed. A low temperature regeneration event may then be performed to observe if the SCR catalyst 150 $NO_X$ conversion efficiency has improved. If this is the case, the low temperature regeneration is resumed.

Figure 2:
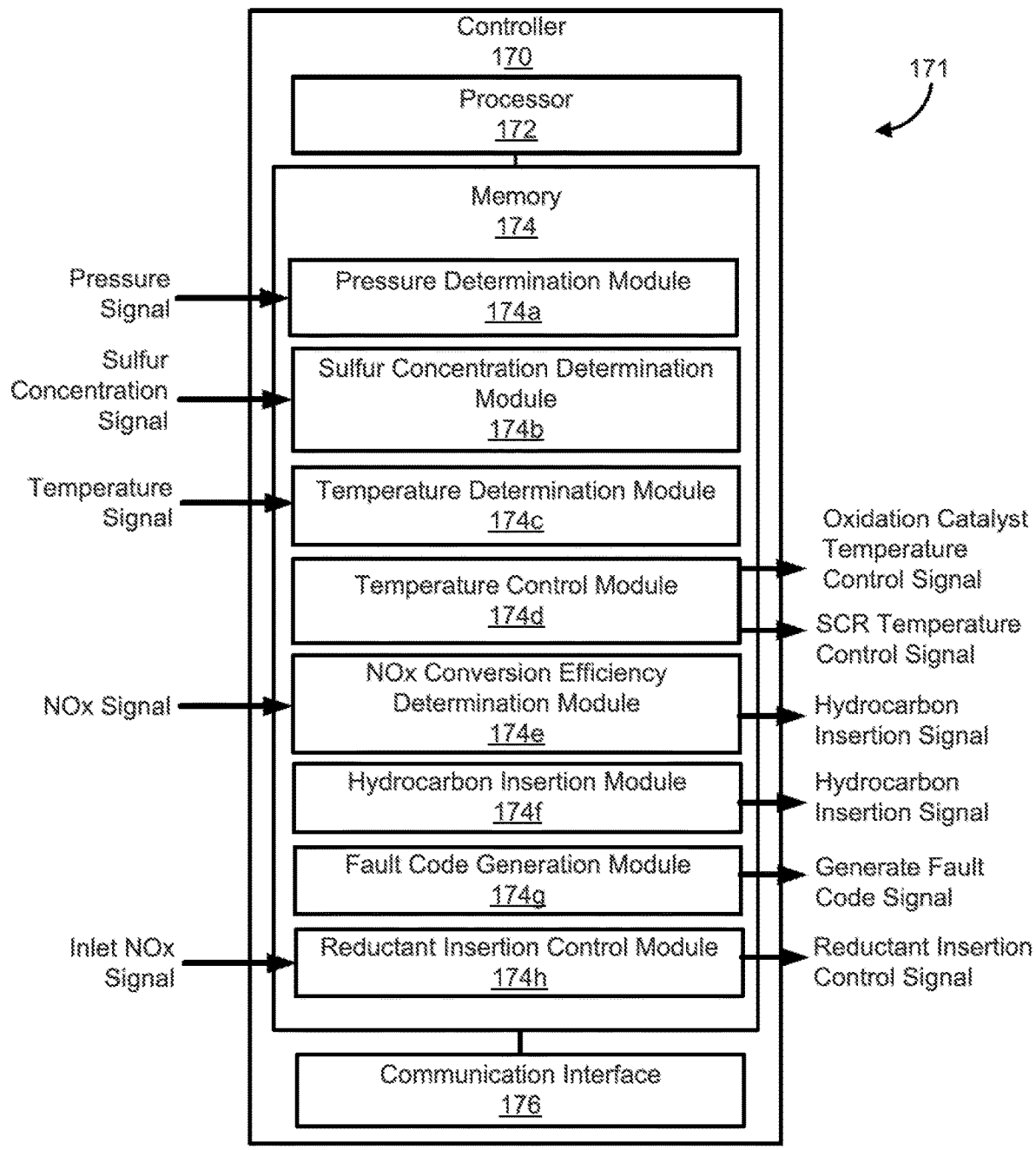
FIG. 2 is a schematic block diagram of a control circuitry that may be used as a controller of the aftertreatment system of FIG. 1, according to an embodiment.

In particular embodiments, the controller 170 may be included in a control module. For example, FIG. 2 is a schematic block diagram of a control module 171 that comprises the controller 170, according to an embodiment. The controller 170 comprises a processor 172, a memory 174, or any other computer readable medium, and a communication interface 176. Furthermore, the controller 170 includes a pressure determination module 174a, a sulfur concentration determination module 174b, a temperature determination module 174c, a temperature control module 174d, a $NO_X$ conversion efficiency determination module 174e, a hydrocarbon insertion module 174f, and a fault code generation module 174g. It should be understood that any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the pressure determination module 174a, the sulfur concentration determination module 174b, the temperature determination module 174c, the temperature control module 174d, the $NO_X$ conversion efficiency determination module 174e, the hydrocarbon insertion module 174f, and the fault code generation module 174g are embodied as machine or computer-readable media (e.g., stored in the memory 174) that is executable by a processor, such as the processor 172. As described herein, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the pressure determination module 174a, the sulfur concentration determination module 174b, the temperature determination module 174c, the temperature control module 174d, the $NO_X$ conversion efficiency determination module 174e, the hydrocarbon insertion module 174f, and the fault code generation module 174g are embodied as hardware units, such as electronic control units. As such, the pressure determination module 174a, the sulfur concentration determination module 174b, the temperature determination module 174c, the temperature control module 174d, the $NO_X$ conversion efficiency determination module 174e, the hydrocarbon insertion module 174f, and the fault code generation module 174g may be embodied as one or more circuitry components including, but not limited to, processing circuitry, network interfaces, peripheral devices, input devices, output devices, sensors, etc.

In some embodiments, the pressure determination module 174a, the sulfur concentration determination module 174b, the temperature determination module 174c, the temperature control module 174d, the $NO_X$ conversion efficiency determination module 174e, the hydrocarbon insertion module 174f, and the fault code generation module 174g may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the pressure determination module 174a, the sulfur concentration determination module 174b, the temperature determination module 174c, the temperature control module 174d, the $NO_X$ conversion efficiency determination module 174e, the hydrocarbon insertion module 174f, and the fault code generation module 174g may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the pressure determination module 174a, the sulfur concentration determination module 174b, the temperature determination module 174c, the temperature control module 174d, the $NO_X$ conversion efficiency determination module 174e, the hydrocarbon insertion module 174f, and the fault code generation module 174g may also include programmable hardware devices such as field programmable gate arrays, programmable array logic, programmable logic devices or the like. In this regard, the pressure determination module 174a, the sulfur concentration determination module 174b, the temperature determination module 174c, the temperature control module 174d, the $NO_X$ conversion efficiency determination module 174e, the hydrocarbon insertion module 174f, and the fault code generation module 174g may include one or more memory devices for storing instructions that are executable by the processor(s) of the pressure determination module 174a, the sulfur concentration determination module 174b, the temperature determination module 174c, the temperature control module 174d, the NO$_X$ conversion efficiency determination module 174e, the hydrocarbon insertion module 174f, and the fault code generation module 174g. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the pressure determination module 174a, the sulfur concentration determination module 174b, the temperature determination module 174c, the temperature control module 174d, the NO$_X$ conversion efficiency determination module 174e, the hydrocarbon insertion module 174f, and the fault code generation module 174g. Thus, the depicted configuration represents the aforementioned arrangement the pressure determination module 174a, the sulfur concentration determination module 174b, the temperature determination module 174c, the temperature control module 174d, the NO$_X$ conversion efficiency determination module 174e, the hydrocarbon insertion module 174f, and the fault code generation module 174g are embodied as machine or computer-readable media. However, as mentioned above, this illustration is not meant to be limiting as the present disclosure contemplates other embodiments such as the aforementioned embodiment where the pressure determination module 174a, the sulfur concentration determination module 174b, the temperature determination module 174c, the temperature control module 174d, the NO$_X$ conversion efficiency determination module 174e, the hydrocarbon insertion module 174f, and the fault code generation module 174g, or at least one circuit of the pressure determination module 174a, the sulfur concentration determination module 174b, the temperature determination module 174c, the temperature control module 174d, the NO$_X$ conversion efficiency determination module 174e, the hydrocarbon insertion module 174f, and the fault code generation module 174g are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the pressure determination module 174a, the sulfur concentration determination module 174b, the temperature determination module 174c, the temperature control module 174d, the NO$_X$ conversion efficiency determination module 174e, the hydrocarbon insertion module 174f, and the fault code generation module 174g) may comprise or otherwise share the same processor which, in some example embodiments, may execute instructions stored, or otherwise accessed, via different areas of memory. Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the first sensor 103, the second sensor 105, the engine 10, the temperature sensors 133 and 153, the pressure sensor 142, or the heaters 134 and 154. The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The pressure determination module 174a is configured to receive a pressure signal from the differential pressure sensor 142 and determine a pressure across the filter 140 therefrom. The pressure determination module 174a may determine whether the filter 140 is loaded with soot compared to a soot loading threshold level, based on pressure difference across the filter 140 exceeding a pressure difference threshold at which the filter 140 should be regenerated. The pressure signal may be used to initiate a regeneration event to regenerate the filter 140.

The sulfur concentration determination module 174b is configured to receive a sulfur concentration signal, for example, from the sulfur sensor 12 or first sensor 103, and determine a concentration of sulfur in the fuel or the exhaust gas therefrom, respectively. The temperature determination module 174c is configured to receive a temperature signal from the oxidation catalyst temperature sensor 133 and the SCR catalyst temperature sensor 153 and determine a temperature of the oxidation catalyst 130 and the SCR catalyst 150, respectively therefrom.

The temperature control module 174d is configured to generate an oxidation catalyst temperature control signal. This control signal could be a command to the engine 10 control actuators to increase the exhaust temperature at the inlet of the aftertreatment assembly 100, or if this temperature is above a target level to the hydrocarbon insertion assembly 132 in order to target an oxidation catalyst outlet temperature (e.g., measured by the oxidation catalyst outlet temperature sensor 135). Alternatively, the temperature control module 174d could be selectively communicated to the oxidation catalyst heater 134 and configured to cause the oxidation catalyst heater 134 to heat the oxidation catalyst 130 to the low regeneration temperature or the high regeneration temperature. Furthermore, the temperature control module 174d is configured to generate a SCR catalyst temperature control signal, which can be achieved via the method stated to meet a target oxidation catalyst outlet temperature, and target the reductant injection control to maintain the ANR above 1.0. Alternatively, the SCR catalyst temperature control signal could be selectively communicated to the SCR catalyst heater 154 and configured to cause the SCR catalyst heater 154 to heat the SCR catalyst 150 to the low regeneration temperature or the high regeneration temperature, as previously described herein.

The $NO_X$ conversion efficiency determination module 174e is configured to determine a $NO_X$ conversion efficiency of the SCR catalyst 150. For example, the $NO_X$ conversion efficiency determination module 174e may receive a $NO_X$ signal from the first sensor 103 and the second sensor 105 and determine a $NO_X$ conversion efficiency of the SCR catalyst 150 therefrom.

The hydrocarbon insertion module 174f is configured to generate a hydrocarbon insertion signal configured to cause the hydrocarbon insertion assembly 132 to selectively insert a predetermined amount of hydrocarbons into the oxidation catalyst 130 to regenerate the filter 140 or SCR catalyst 150, as previously described herein. The fault code generation module 174g is configured to generate a fault code signal, for example, in response to a concentration of sulfur in the fuel being equal to or greater than the critical sulfur threshold, or the SCR catalyst 150 regeneration events occurring within the critical time interval threshold.

In some embodiments, the controller 170 may also include a reductant insertion control module 174h. The reductant insertion control module 174h is configured to receive an inlet $NO_X$ signal, for example, from the first sensor 103 and determine an inlet $NO_X$ amount or level of $NO_X$ gases entering the SCR system 150. The reductant insertion control module 174h is configured to determine an amount of ammonia to $NO_X$ ratio for converting the inlet $NO_X$ amount into nitrogen gas. The reductant insertion control module 174h may generate a reductant insertion signal configured to cause the reductant insertion assembly 120 to insert an appropriate amount of reductant into the exhaust gas for achieving the requisite ammonia to $NO_X$ ratio. For example, during a low temperature SCR catalyst 150 desulfation event, the reductant insertion control module 174h may be configured to insert an appropriate amount of the reductant into the exhaust gas such that the ammonia to $NO_X$ ratio is >1.0.

Figure 8:
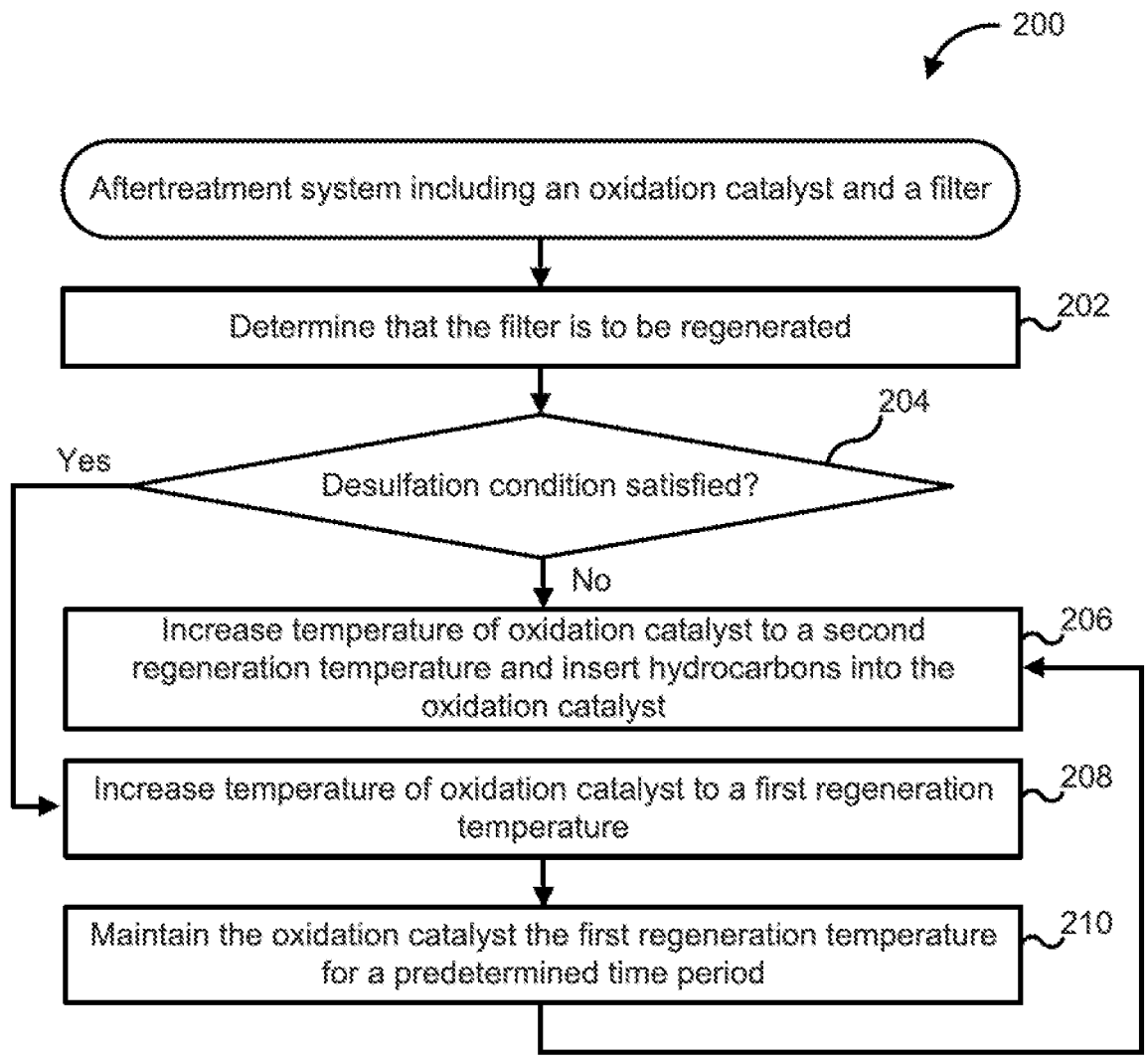
FIG. 8 is a schematic flow diagram of a method for desulfating an oxidation catalyst so as to regenerate the oxidation catalyst, according to an embodiment.

FIG. 8 is a schematic flow diagram of an example method 200 for desulfating an oxidation catalyst (e.g., the oxidation catalyst 130) so as to regenerate the oxidation catalyst, according to an embodiment. The oxidation catalyst may be included in an aftertreatment system (e.g., the aftertreatment system 100) that also includes a filter (e.g., the filter 140) disposed downstream of the oxidation catalyst 130, and is configured to decompose constituents of an exhaust gas flowing therethrough. While method 200 is described herein as being implemented with the controller 170, it should be understood that the operations of the method 200 may be implemented in any controller included in any aftertreatment system.

The method 200 includes determining that the filter is to be regenerated, at 202. For example, the pressure determination module 174a may receive a signal from the differential pressure sensor 142, and determine whether the filter 140 is loaded with soot above a pre-determined soot loading threshold therefrom. In response, to the filter 140 being loaded with soot above the threshold level corresponding to the pressure difference exceeding the pressure difference threshold, the pressure determination module 174a determines that the filter 140 is to be regenerated.

In some embodiments, the method 200 includes determining whether a desulfation condition is satisfied, at 204. In some embodiments, the desulfation condition includes a concentration of sulfur in a fuel that is combusted to generate the exhaust gas, and the desulfation condition being satisfied includes the concentration of sulfur that is being combusted to generate the exhaust gas being equal to or greater than a predetermined sulfur concentration threshold. For example, the sulfur concentration determination module 174b may receive a signal from the sulfur sensor 12 and determine whether the concentration of sulfur in the fuel provided to the engine 10 is equal to or greater than the sulfur concentration threshold (e.g., approximately 15 ppm).

In other embodiments, the desulfation condition includes comparing the measured exotherm to a reference exothermal efficiency curve across the oxidation catalyst 130. In such embodiments, the desulfation condition being satisfied comprises the measured exotherm being outside of a predetermined range. For example, the temperature determination module 174c may receive a temperature signal from the oxidation catalyst temperature sensor 133 to determine an exothermal temperature of the exhaust gas flowing across the oxidation catalyst 130 and the filter 140 due to combustion of hydrocarbons inserted into the oxidation catalyst 130 that heat the exhaust gas in an exothermic reaction.

In response to determining that the desulfation condition not being satisfied (204:NO), the temperature of the oxidation catalyst is increased to a second or high regeneration temperature, and hydrocarbons are inserted into the oxidation catalyst, at 206. For example, in response to the sulfur concentration determination module 174b determining that the concentration of sulfur in the fuel being consumed by the engine 10 is less than the sulfur concentration threshold (e.g., less than 15 ppm), or the temperature determination module 174c determining that the measured exotherm across the oxidation catalyst 130 is within the predetermined range, the temperature control module 174d commands the hydrocarbon insertion assembly 132 or the oxidation catalyst heater 134 to increase the temperature of the oxidation catalyst 130 the high regeneration temperature (e.g., equal to or greater than 550 degrees Celsius).

In response to the desulfation condition being satisfied (204:YES), the temperature of the oxidation catalyst is increased to a first or low regeneration temperature, at 208. For example, in response to the sulfur concentration determination module 174b determining that the concentration of sulfur in the fuel being consumed by the engine 10 is equal to or greater than the sulfur concentration threshold (e.g., 15 ppm), or the temperature determination module 174c determining that the measured exotherm across the oxidation catalyst 130 is outside the predetermined range, the temperature control module 174d commands the oxidation catalyst heater 134 to increase the temperature of the oxidation catalyst 130 to the low regeneration temperature (e.g., greater than or equal to 400 degree Celsius and less than 550 degrees Celsius).

At 210, the temperature of the oxidation catalyst is maintained at the low regeneration temperature for a predetermined time period. For example, the temperature control module 174d is configured to maintain the temperature at the low regeneration temperature for the predetermined time period (e.g., 15-30 minutes) to remove sulfur accumulated on the oxidation catalyst 130. The method 200 may then proceed to operation 206.

Figure 9A:
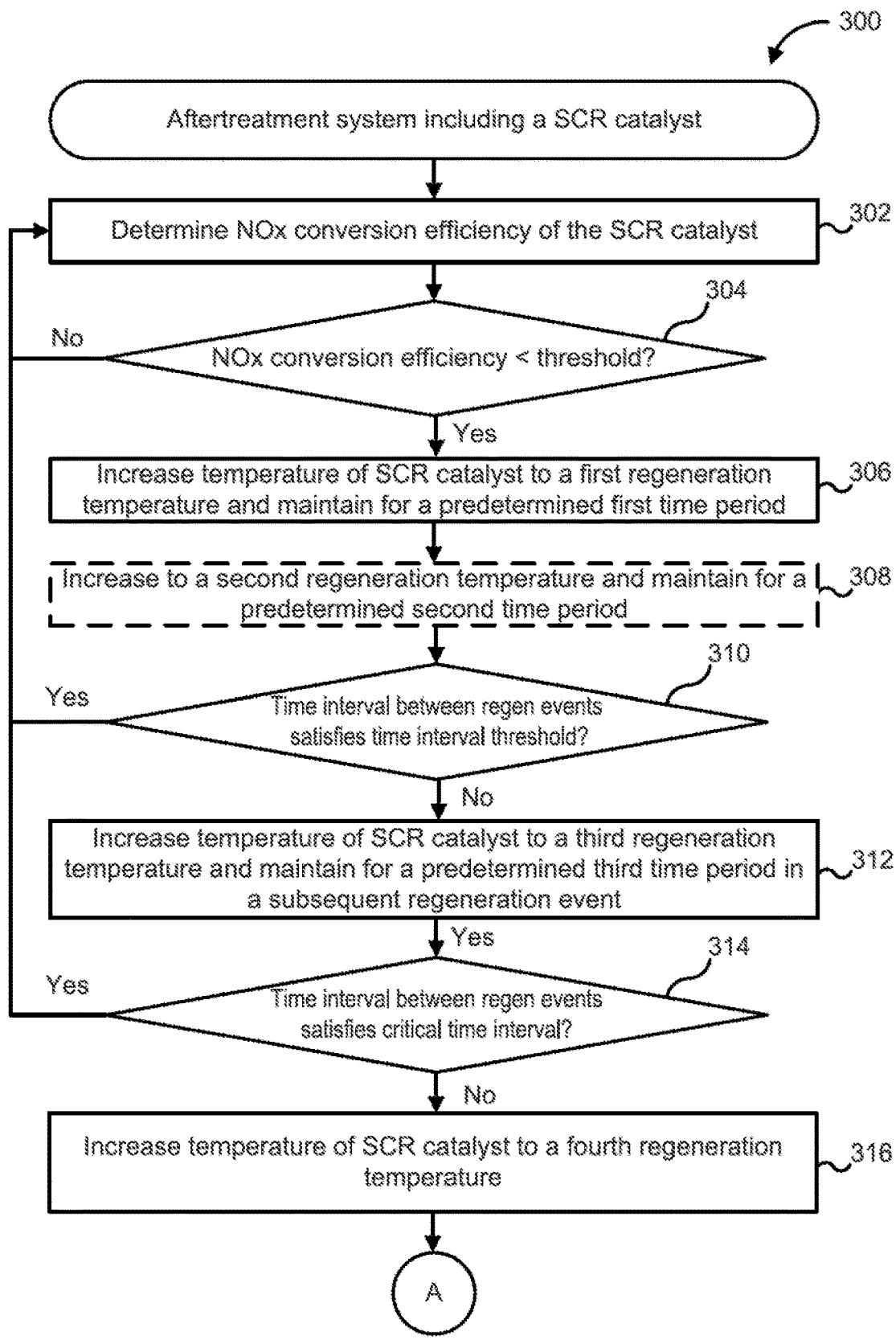
FIGS. 9A-9B are schematic flow diagrams of a method for desulfating a SCR catalyst so as to regenerate the SCR catalyst, according to an embodiment.
Figure 9B:
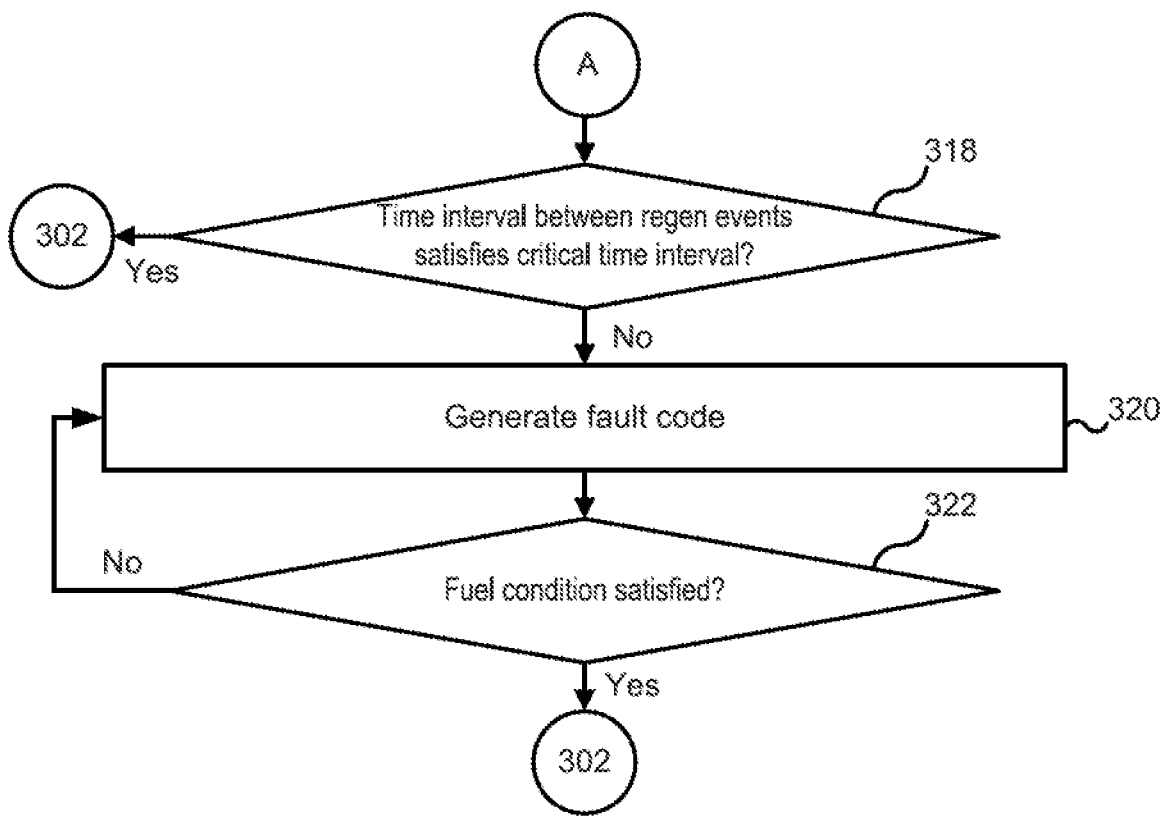

FIGS. 9A-9B are schematic flow diagrams of a method 300 for desulfating a SCR catalyst (e.g., the SCR catalyst 150) so as to regenerate the SCR catalyst, according to an embodiment. The SCR catalyst may be included in an aftertreatment system (e.g., the aftertreatment system 100) configured to decompose constituents of an exhaust gas produced by an engine (e.g., the engine 10). While method 300 is described herein as being implemented with the controller 170, it should be understood that the operations of the method 300 may be implemented in any controller included in any aftertreatment system.

The method 300 includes determining a $NO_X$ conversion efficiency of the SCR catalyst, at 302. For example, the $NO_X$ conversion efficiency determination module 174e may receive signals from the first and/or second sensor 103 and 105 and determine a $NO_X$ conversion efficiency of the SCR catalyst 150 therefrom.

At 304, the method 300 includes determining whether the $NO_X$ conversion efficiency of the SCR catalyst is less than a predetermined threshold. For example, the $NO_X$ conversion efficiency determination module 174e may determine if the $NO_X$ conversion efficiency is less than the predetermined threshold (e.g., 90% $NO_X$ conversion efficiency) due to sulfur accumulation on the SCR catalyst 150. This $NO_X$ conversion efficiency may be an instantaneous value or a time averaged value over specific operating conditions and time interval.

In response to the $NO_X$ conversion efficiency of the SCR catalyst being greater than the predetermined threshold (304:NO), the method 300 returns to operation 302. On determining that the $NO_X$ conversion efficiency of the SCR catalyst is less than the predetermined threshold (304:YES), the method 300 includes increasing a temperature of the SCR catalyst to a first regeneration temperature and targets SCR reductant dosing to maintain the ANR>1.0, and maintains the temperature of the SCR catalyst at the first regeneration temperature for a predetermined first time period, at 306. For example, the temperature control module 174d may command hydrocarbon insertion assembly 132 to dose hydrocarbon into the oxidation catalyst 130 to increase the outlet temperature or command the SCR catalyst heater 154 to heat the SCR catalyst 150 to the predetermined first regeneration temperature (e.g., greater than or equal to 400 degree Celsius and less than 550 degrees Celsius, inclusive) and maintain the SCR catalyst at the first regeneration temperature for the first time period (e.g., approximately 30-60 minutes). In some embodiments, the low temperature regeneration operations may be initiated in response to sulfur concentration in the fuel that is being combusted to generate the exhaust gas being greater than a predetermined sulfur concentration threshold (e.g., greater than 15 ppm) but less than a critical sulfur concentration threshold (e.g., 500 ppm).

In some embodiments, the method 300 also includes increasing the temperature of the SCR catalyst to a predetermined second regeneration temperature that is higher than the first regeneration temperature but lower than a high regeneration temperature (e.g., less than 550 degrees Celsius), and maintaining the SCR catalyst at the second regeneration temperature for a predetermined second time period, at 308. For example, the temperature control module 174d may be configured to increase or ramp the temperature of the SCR catalyst 150 from the first regeneration temperature (e.g., 400 or 450 degrees Celsius) to the second regeneration temperature (e.g., 500 degrees Celsius) that is lower than the high regeneration temperature (e.g., 550 degrees Celsius), and maintain the SCR catalyst 150 thereat for the second predetermined time period (e.g., approximately 15-30 minutes).

At 310, the method 300 includes determining if a time interval between regeneration events satisfies a time interval threshold. For example, the controller 170 may determine if a time interval between subsequent regeneration events for regenerating the SCR catalyst 150 is equal to or greater than a predetermined time interval threshold, for example, 12 hours. In response to the time interval satisfying the time interval threshold (310:YES), for example, the time interval being equal to or greater than time interval threshold (e.g., 12 hours) the method 300 returns to operation 302.

In response to the time interval not satisfying the time interval threshold (310:NO), for example, time interval between regeneration events being less than 12 hours, the method 300 includes heating the SCR catalyst to a third regeneration temperature that is higher than the first regeneration temperature but lower than the high regeneration temperature (e.g., less than 550 degrees Celsius), and maintains the SCR catalyst 150 at the third low regeneration temperature, at 312. For example, the temperature control module 174d may command the SCR catalyst heater 154 to heat the SCR catalyst 150 to the third regeneration temperature (e.g., 500 degrees Celsius) for the third time period (e.g., 30-60 minutes).

In some embodiments, the method 300 includes determining if the time interval between regeneration events satisfied a critical time interval, at 314. In response to the time interval satisfying the critical time interval threshold (314:YES), for example, the time interval being greater than the critical time interval (e.g., 12 hours), the method 300 returns to operation 302. In response to the time interval not satisfying the critical time interval (314:NO), for example, being less than the critical time interval, the method 300 includes increasing the temperature of the SCR catalyst 150 to a fourth regeneration temperature (e.g., 550 degrees Celsius or higher) in a subsequent regeneration event, at 316. For example, the temperature control module 174d may increase the temperature of the SCR catalyst 150 to the high regeneration temperature in a subsequent regeneration event.

At 318, the method 300 includes determining again if the time interval satisfies the critical time interval. If the critical time interval is satisfied (318:YES), the method 300 returns to operation 302. In response to the critical time interval still not being satisfied (318:NO), a fault code is generated, at 320. For example, the fault code generation module 174g may generate a fault code, and may also be configured to light a MTh. In some embodiments, the method 300 may also include generating the fault code in response to a concentration of sulfur in the fuel being equal to or greater than a critical sulfur level threshold (e.g., 500 ppm).

At 322, the method 300 may include determining if a fuel condition is satisfied. For example, the controller 170 may determine if all the fuel that includes a sulfur concentration greater than the critical sulfur concentration is consumed, or a fuel tank is refilled. If the fuel condition is satisfied (322:YES), the method 300 returns to operation 302. If the fuel condition is not satisfied (322:NO), the method returns to operation 320 and a fault code is generated.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the term "approximately" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system for reducing constituents of an exhaust gas having a sulfur content, the aftertreatment system comprising:
   an oxidation catalyst;
   a filter disposed downstream of the oxidation catalyst; and
   a controller configured to, in response to determining that the filter is to be regenerated and a desulfation condition being satisfied:
      cause a temperature of the oxidation catalyst to increase to a first regeneration temperature that is greater than or equal to 400 degrees Celsius and less than 550 degrees Celsius,
      cause the temperature of the oxidation catalyst to be maintained at the first regeneration temperature for a first time period, and
      after the first time period, cause the temperature of the oxidation catalyst to increase to a second regeneration temperature equal to or greater than 550 degrees Celsius,
      wherein the desulfation condition being satisfied comprises a measured exotherm of the oxidation catalyst being smaller than the exothermal efficiency curve of a non-sulfated oxidation catalyst.

2. The aftertreatment system of claim 1, wherein the controller is configured to, in response to determining that the filter is to be regenerated and the desulfation condition is not satisfied:
   cause increase of the temperature of the oxidation catalyst to the second regeneration temperature without maintaining the oxidation catalyst at the first regeneration temperature for the first time period; and
   cause insertion of hydrocarbons into the oxidation catalyst.

3. The aftertreatment system of claim 2, further comprising:
   an oxidation catalyst heater that is coupled to the oxidation catalyst and configured to be controlled by the controller to cause the temperature of the oxidation catalyst to increase and be maintained.

4. The aftertreatment system of claim 1, further comprising:
   an oxidation catalyst heater that is coupled to the oxidation catalyst and configured to be controlled by the controller to cause the temperature of the oxidation catalyst to increase and be maintained.

* * * * *